Figure 4:
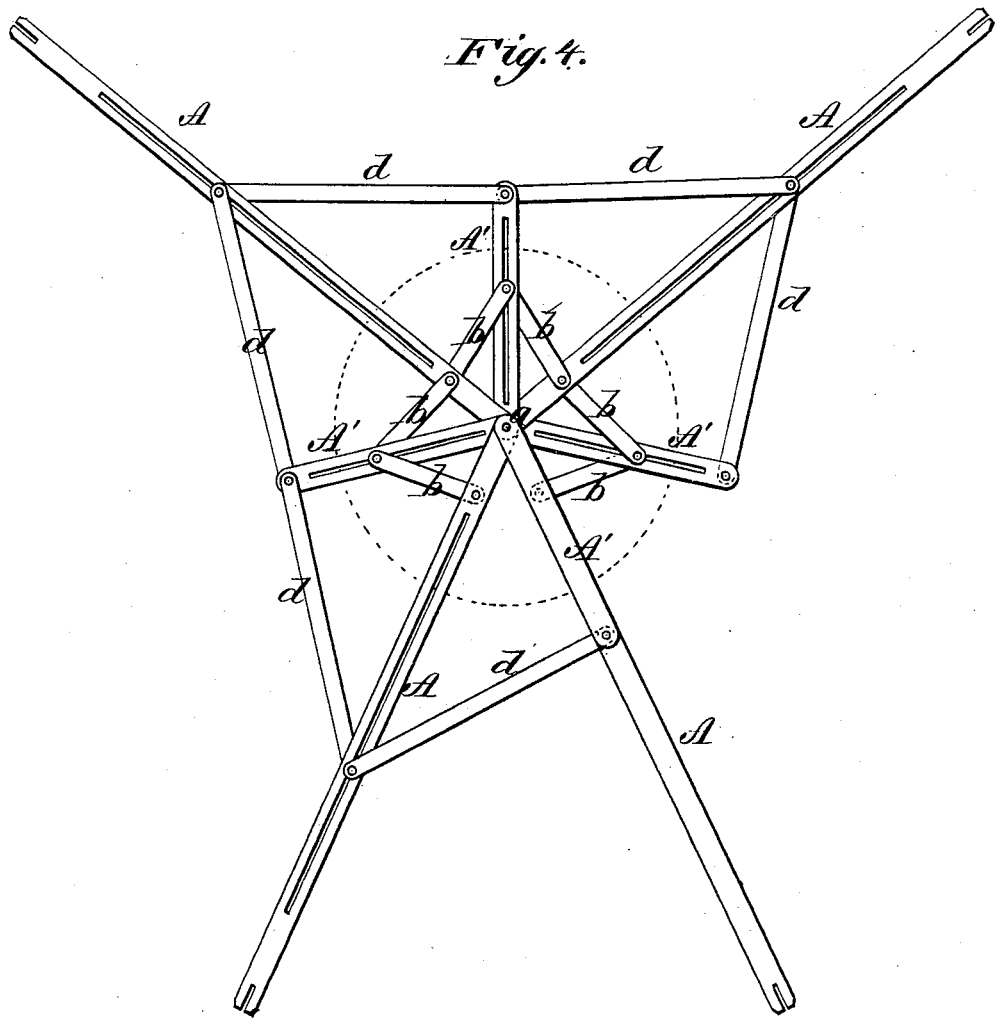

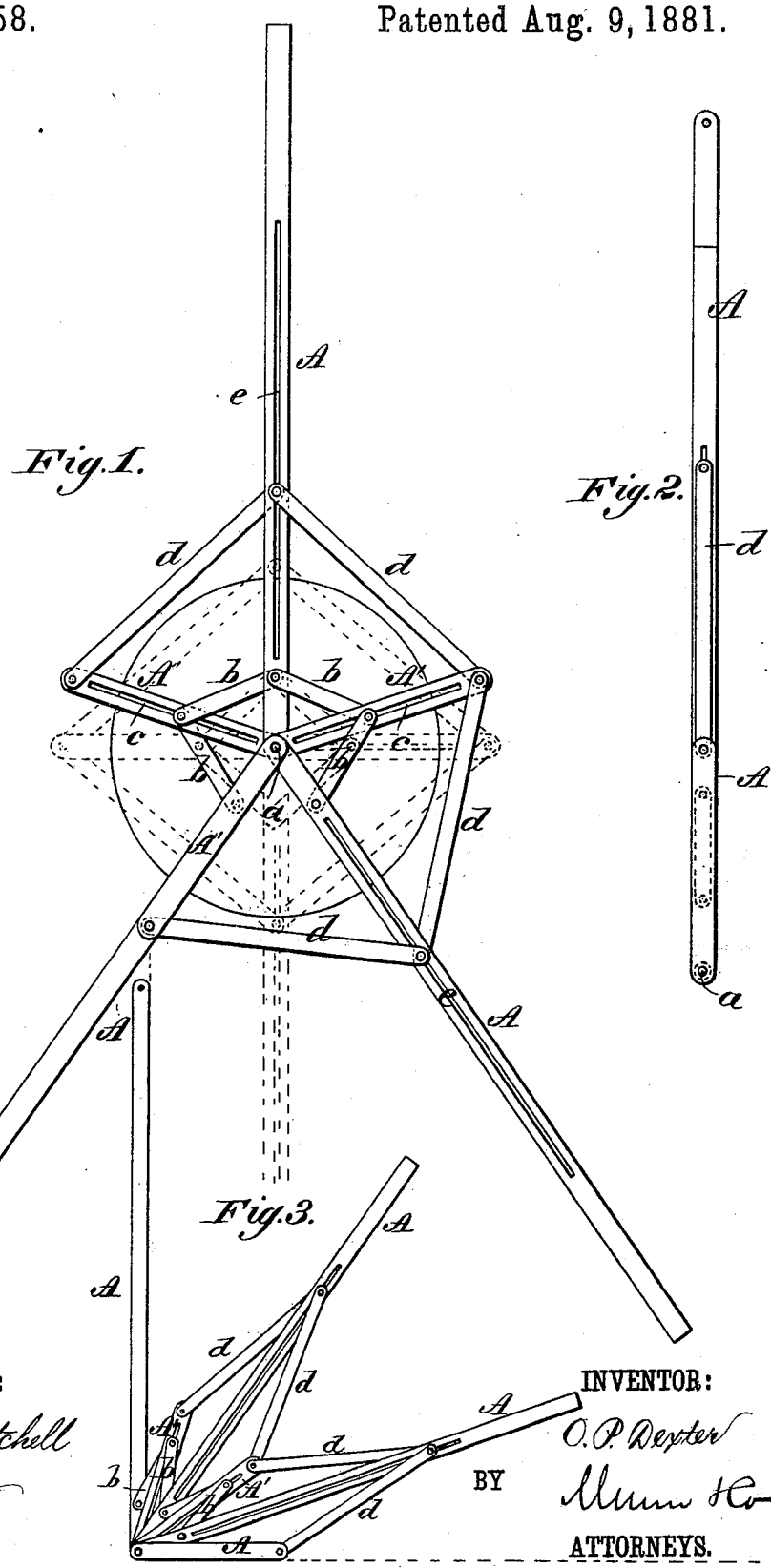

(Model.) 2 Sheets—Sheet 2.

O. P. DEXTER.
INSTRUMENT FOR DIVIDING ANGLES.

No. 245,458. Patented Aug. 9, 1881.

WITNESSES:
Donn Twitchell.
C. Sedgwick

INVENTOR:
O. P. Dexter
BY Munn & Co
ATTORNEYS.

UNITED STATES PATENT OFFICE.

ORRANDO P. DEXTER, OF NEW YORK, N. Y.

INSTRUMENT FOR DIVIDING ANGLES.

SPECIFICATION forming part of Letters Patent No. 245,458, dated August 9, 1881.

Application filed May 26, 1881. (Model.)

*To all whom it may concern:*

Be it known that I, ORRANDO P. DEXTER, of the city, county, and State of New York, have invented a new and useful Improvement in Drafting-Instruments, of which the following is a specification.

My invention relates to instruments for dividing and subdividing circles and angles; and it consists in an instrument combining a series of bars or arms pivoted to a common center, and slide-links connecting the bars, as hereinafter described and claimed.

In the accompanying drawings, Figure 1 is a plan view of the instrument as applied to use in dividing a circle. Fig. 2 shows the instrument closed. Fig. 3 illustrates the division of a right angle into five equal parts and the reduction of the number of divisions by the arrangement of the arms. Fig. 4 shows an instrument suitable for more minute divisions.

Similar letters of reference indicate corresponding parts.

A A A A' A' A' are flat strips of metal, attached together at one end by a pin, $a$. These strips are the main or dividing arms that swing on the common center. Preferably the three alternate arms, A, are the longer, for convenience in handling the instrument.

$b\ b\ b\ b$ are short links of equal length, pivoted to the arms A equidistant from the center $a$, and connected to arms A' by pins passing through slots $c$ in said arms, so that the ends may slide.

$d\ d\ d\ d$ are longer links of equal length, pivoted to the arms A' A', and to one arm A and connected to the other two arms A by pins passing through slots $e$.

It will be understood that if the arms were all connected by either set of links the arms would be held immovably equidistant; but there being but four links, $b$ or $d$, and the intermediate connection being formed to slide, the arms may be swung on center $a$, and the distance between each pair will remain the same, except between the two unconnected by a link, $d$. In order to bring the slide-pins of the links $b\ d$ in separate arms, the two arms A' A, unconnected by links $d$, are connected by one link, $b$.

In use for dividing a circle the instrument is laid upon the circle, as illustrated in Fig. 1, and the arms A A' divide the circle into equal parts. By opening the instrument far enough to lap one or more of the arms A A', as shown in dotted lines in Fig. 1, the division is made into a less number of parts.

To divide an angle, two of the arms A A' will be placed on the lines forming the angle, and the intermediate arms will indicate the divisions. The arms A A' may be increased in number.

In Fig. 4 the instrument is shown with eight arms, which will give a division of seven when the instrument is completely opened and the two outside arms brought together. By lapping two or more arms the number of divisions is reduced to six and five, as the case may be.

Having thus described my invention, I claim as new and desire to secure by Letters Patent—

1. The drafting-instrument consisting of the arms A A', pivoted together at one end, and connected by jointed links that are fitted to slide on the alternate arms, substantially as shown and described.

2. The combination, in a drafting-instrument, of slotted arms A A', connected by a pivot, $a$, and links $b\ d$, connecting the arms, substantially as shown and described, for use as specified.

ORRANDO P. DEXTER.

Witnesses:
C. SEDGWICK,
J. H. SCARBOROUGH.